United States Patent
Nichols et al.

(10) Patent No.: US 8,289,025 B2
(45) Date of Patent: Oct. 16, 2012

(54) DERIVING AN ELECTROMAGNETIC FIELD IN ONE DIRECTION BASED ON MEASUREMENT DATA OF ONE OR MORE SENSING ELEMENTS FOR MEASURING AN ELECTROMAGNETIC FIELD IN ANOTHER DIRECTION

(75) Inventors: Edward Nichols, Berkeley, CA (US); Nestor Cuevas, Albany, CA (US)

(73) Assignee: WesternGeco L.L.C., Houston, TX (US)

( * ) Notice: Subject to any disclaimer, the term of this patent is extended or adjusted under 35 U.S.C. 154(b) by 503 days.

(21) Appl. No.: 12/488,641

(22) Filed: Jun. 22, 2009

(65) Prior Publication Data

US 2010/0321024 A1 Dec. 23, 2010

(51) Int. Cl.
*G01V 3/00* (2006.01)
(52) U.S. Cl. .......................................... 324/365; 702/11
(58) Field of Classification Search .................. 324/365; 702/11
See application file for complete search history.

(56) References Cited

U.S. PATENT DOCUMENTS

| 4,862,089 | A | 8/1989 | Sigal |
| 7,116,108 | B2 | 10/2006 | Constable |
| 7,471,089 | B2 | 12/2008 | Zerilli et al. |
| 7,482,813 | B2 | 1/2009 | Constable et al. |
| 8,008,921 | B2 * | 8/2011 | Alumbaugh et al. ......... 324/365 |
| 2005/0134278 | A1 * | 6/2005 | Nichols ........................ 324/348 |
| 2008/0103700 | A1 * | 5/2008 | van den Berg et al. .......... 702/6 |
| 2008/0169817 | A1 * | 7/2008 | Morrison et al. ............. 324/365 |
| 2008/0246485 | A1 | 10/2008 | Hibbs et al. |
| 2008/0309346 | A1 | 12/2008 | MacGregor et al. |
| 2009/0295394 | A1 * | 12/2009 | Babour et al. ................ 324/350 |
| 2010/0121579 | A1 * | 5/2010 | Chen et al. ..................... 702/11 |

OTHER PUBLICATIONS

Constable et al., Marine Magnetotellurics for Petroleum Exploration Part I: A Sea-Floor Equipment System, Geophysics, May-Jun. 1998, pp. 816-825, vol. 63, No. 3.
PCT Search Report, dated Feb. 1, 2011, Application No. PCT/US2010/039537.

* cited by examiner

*Primary Examiner* — Arleen M Vazquez

(57) ABSTRACT

A survey module includes at least one sensing element to measure a first electromagnetic (EM) field along a first direction, and circuitry to derive a second EM field along a second, different direction based on the first EM field.

16 Claims, 3 Drawing Sheets

DERIVING AN ELECTROMAGNETIC FIELD IN ONE DIRECTION BASED ON MEASUREMENT DATA OF ONE OR MORE SENSING ELEMENTS FOR MEASURING AN ELECTROMAGNETIC FIELD IN ANOTHER DIRECTION

TECHNICAL FIELD

The invention generally relates to deriving an electromagnetic field in one direction based on measurement data of one or more sensing elements for measuring an electromagnetic field in another direction.

BACKGROUND

Various electromagnetic (EM) techniques exist to perform surveys of subterranean structures for identifying structures of interest, such as structures containing hydrocarbons. One such technique is the magnetotelluric (MT) survey technique that employs time measurements of naturally occurring electric and magnetic fields for determining the electrical conductivity distribution beneath the surface. Another technique typically used in marine environments is the controlled source EM (CSEM) surveying technique, in which an EM source transmitter is placed or towed in a body of water. Survey modules containing electric and/or magnetic field sensors are deployed on a water bottom surface (e.g., sea floor), or towed along within an area of interest to make measurements from which a geological survey of the subterranean structure underneath the water bottom surface can be derived. CSEM techniques can also be applied to land-based surveying.

SUMMARY

In general, according to an embodiment, a method of performing electromagnetic (EM) surveying of a subterranean structure includes receiving measurement data from first electrodes for measuring a first electric field in a first direction, and receiving measurement data from a second electrode that is spaced apart from the first electrodes along a second direction that is orthogonal to the first direction. A second electric field in the second direction is derived based on the measurements data of the second electrode and at least one of the first electrodes.

In general, according to another embodiment, a survey module includes at least one sensing element to measure a first electromagnetic (EM) field along a first direction, and circuitry to derive a second EM field along a second, different direction based on the first EM field.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
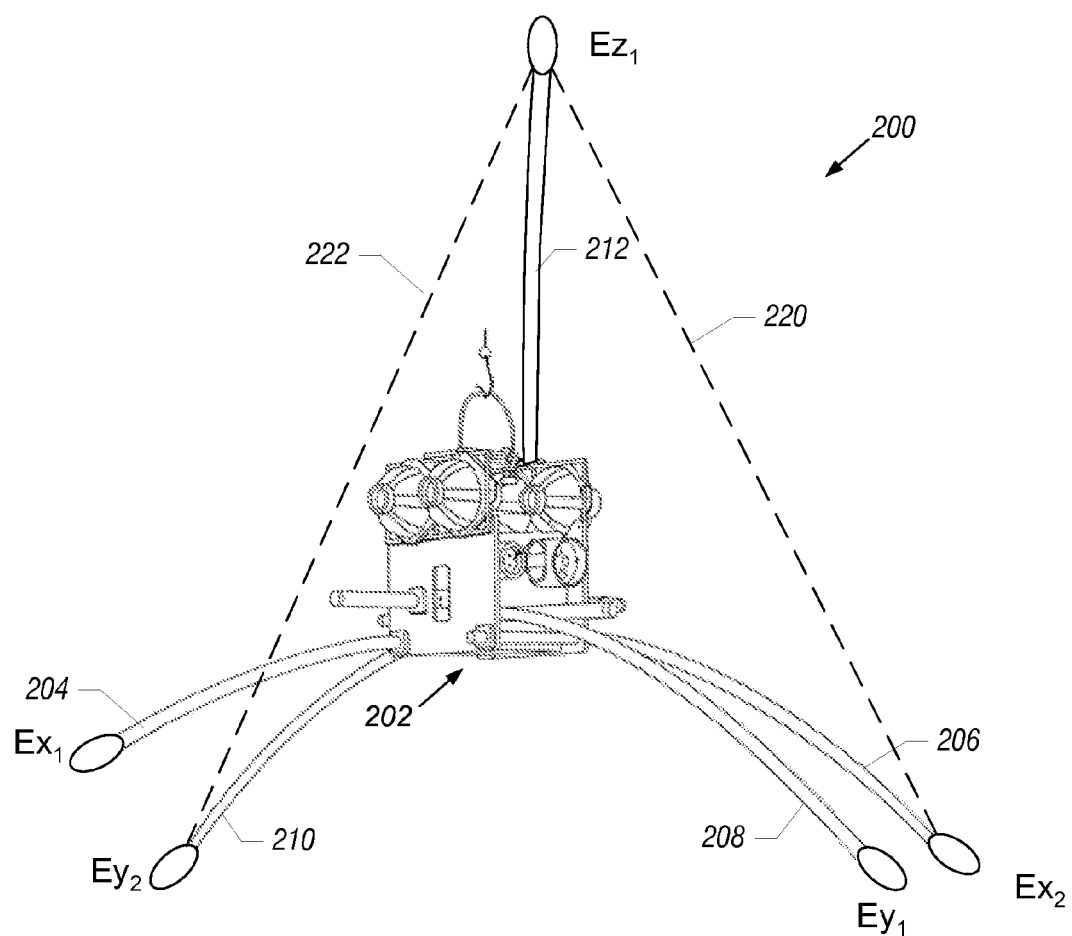
FIG. 1 is a schematic diagram of a survey module having electrodes arranged according to an embodiment.

FIG. 1 illustrates a survey module 200 according to an embodiment for performing electromagnetic (EM) surveying of a subterranean structure underneath a surface. The survey module 200 is used in a marine survey data acquisition arrangement. In other embodiments, the techniques according to some embodiments are applicable to land-based survey data acquisition arrangements or wellbore survey data acquisition arrangements.

The survey module 200 has a main body 202 that includes various electronic components, such as sensors, storage devices, acoustic ranging devices, and so forth. Arms (or booms) 204 and 206 are deployed generally along an x direction, arms 208 and 210 are deployed generally along a y direction, and an arm 212 is generally deployed along a z direction. In some implementations, the arms 204, 206, 208, 210, and 212 can be flexible arms that are allowed to flex in a body of water. The x and y directions are orthogonal horizontal directions that are generally parallel to a surface on which the survey module 200 is positioned. The surface can be a water bottom surface (e.g., sea floor) or a land surface, underneath which a subterranean structure to be surveyed is located. The z direction is a vertical direction that is generally orthogonal to both the x and y directions.

In the exemplary implementation, the survey module 200 also includes magnetic field sensing elements for measuring magnetic fields. In an alternative implementation, the magnetic field sensing elements can be omitted.

When performing survey data acquisition during surveying of the subterranean structure, measurements are collected by $E_{x1}$ and $E_{x1}$ electrodes mounted on arms 204 and 206, respectively, measurements are collected by $E_{y1}$ and $E_{y2}$ electrodes mounted on arms 208 and 210, respectively, and measurements are collected by an $E_{z1}$ electrode mounted arm 212. Note that in accordance with some embodiments, there is just a single $E_{z1}$ electrode mounted on the arm 212, instead of two electrodes. In fact, in the implementation depicted, the $E_{z1}$ electrode is mounted at the end of the arm 212 farthest away from the main body 202 of the survey module 200. Alternatively, the $E_{z1}$ electrode can be located at another point along the arm 212.

The position of the $E_{z1}$ electrode on the arm 212 allows the $E_{z1}$ electrode to be positioned sufficiently far away from the main body 202 of the survey module 200 such that reduced electrical interference is experienced by the $E_{z1}$ electrode. In the exemplary implementation shown, the $E_{z1}$ electrode is located at the end of arm 212, just like the $E_{x1}$, $E_{x2}$, $E_{y1}$, and $E_{y2}$ electrodes are mounted at the ends of respective arms 204, 206, 208, and 210.

An x-direction electric field, $E_x$, is determined based on the measurements by the $E_{x1}$ and $E_{x2}$ electrodes. A y-direction electric field, $E_y$, is determined based on the measurements by the $E_{y1}$ and $E_{y2}$ electrodes. However, since there is just one $E_{z1}$ electrode, the z-direction electric field, $E_z$, is computed based on measurements of the $E_{z1}$ electrode plus measurements of at least some of the $E_{x1}$, $E_{x2}$, $E_{y1}$, and $E_{y2}$ electrodes. In other words, the $E_z$ electric field is derived based on the measurement of the $E_{z1}$ electrode plus measurements of electrodes for measuring electric fields in at least one direction (x and/or y direction) that is orthogonal to the z direction.

According to the FIG. 1 embodiment, the $E_x$ and $E_y$ electric fields are calculated as follows:

$$E_x = E_{x2} - E_{x1}, \quad \text{(Eq. 1)}$$

$$E_y = E_{y2} - E_{y1}. \quad \text{(Eq. 2)}$$

Note that $E_x$ and $E_y$ can also be expressed as follows:

$$E_x = \frac{1}{2}[(E_{x2} - E_{z1}) + (E_{z1} - E_{x2})], \quad \text{(Eq. 3)}$$

$$E_y = \frac{1}{2}[(E_{y2} - E_{z1}) + (E_{z1} - E_{y2})], \quad \text{(Eq. 4)}$$

The vertical electric field $E_z$ can be computed as follows:

$$E_{zx} = \frac{1}{2}[(E_{x2} - E_{z1}) - (E_{z1} - E_{x2})], \quad \text{(Eq. 5)}$$

$$E_{zy} = \frac{1}{2}[(E_{y2} - E_{z1}) - (E_{z1} - E_{y2})], \text{ and} \quad \text{(Eq. 6)}$$

$$E_z = \frac{1}{2}(E_{zx} + E_{zy}). \quad \text{(Eq. 7)}$$

In Eq. 5 above, the $E_{zx}$ value is computed based on the measurement of the $E_{z1}$ electrode and based on the measurement of the $E_{x2}$ electrode. In Eq. 6 above, the $E_{zy}$ value is computed based on the measurement of the $E_{z1}$ electrode and based on the measurement of the $E_{y2}$ electrodes. Effectively, the $E_{zx}$ value is computed based on a diagonal dipole 220 (defined between the $E_{z1}$ and $E_{x2}$ electrodes) that is slanted with respect to both the vertical and horizontal directions. Similarly, the $E_{zy}$ value is computed based on a diagonal dipole 222 (defined between the $E_{z1}$ and the $E_{y2}$ electrodes) that is slanted with respect to both the vertical and horizontal directions.

According to Eq. 7, the $E_z$ electric field is computed by aggregating (e.g., averaging) the $E_{zx}$ and $E_{zy}$ values.

Figure 2:
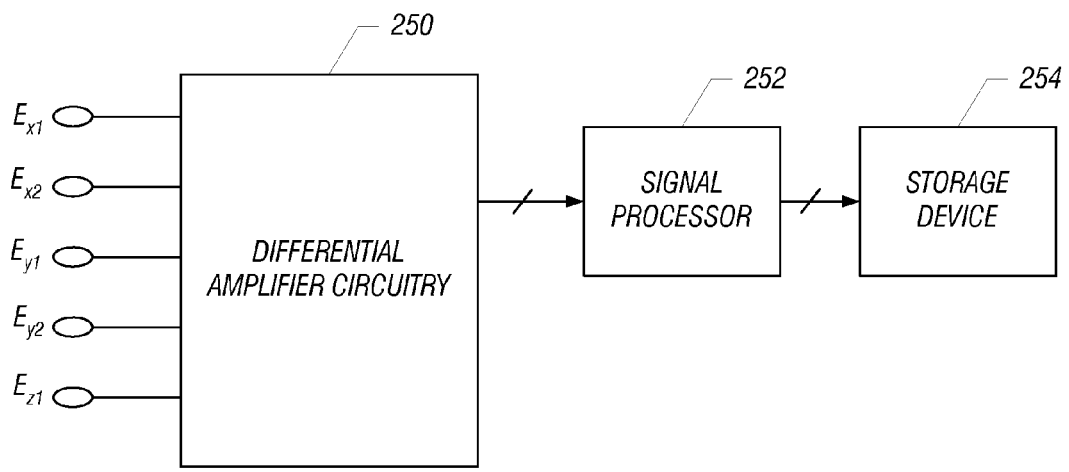
FIG. 2 is a block diagram of circuitry in the survey module according to an embodiment.

FIG. 2 shows circuitry that can be provided in the survey module 200 for performing the computations of Eqs. 1, 2, and 5-7. Differential amplifier circuitry 250 receives the outputs of the $E_{z1}$, $E_{x1}$, $E_{x2}$, $E_{y1}$, and $E_{y2}$ electrodes, and applies the differencing of Eqs. 1, 2, and 5-7. For example, the differential amplifier circuitry 250 can include a number of operational amplifiers to perform respective differencing operations.

The outputs of the differential amplifier circuitry 250 are provided to a signal processor 252 to perform further computations according to Eqs. 1, 2, and 5-7. The outputs of the differential amplifier circuitry 250 are voltage difference values—electric fields are computed by dividing the voltage difference values by corresponding distances representing the separations ("baseline separations") of respective pairs of electrodes.

The electric fields $E_x$, $E_y$, and $E_z$ computed by the signal processor 252 are stored in a storage device 254 in the survey module 200. The stored data can later be retrieved for further processing.

Alternatively, instead of computing the $E_z$ electric field according to Eq. 7, either the $E_{zx}$ or $E_{zy}$ value can be used as the $E_z$ electric field. Also, although Eq. 5 indicates that the $E_{zx}$ value is calculated based on just $E_{z1}$ and $E_{x2}$ electrode measurements, note that the $E_{zx}$ value can instead be computed based on $E_{z1}$ and $E_{x1}$ electrode measurements, or based on $E_{z1}$, $E_{x1}$, and $E_{x2}$ electrode measurements. Similarly, although Eq. 6 indicates that the $E_{zy}$ value is calculated based on just $E_{z1}$ and $E_{y2}$ electrode measurements, note that the $E_{zy}$ value can instead be computed based on $E_{z1}$ and $E_{y1}$ electrode measurements, or based on $E_{z1}$, $E_{y1}$, and $E_{y2}$ electrode measurements.

It is noted that using the configuration according to some embodiments, the baseline separation of electrodes to produce the effective $E_z$ electric field is substantially increased. As indicated by the dashed lines 220 and 222 in FIG. 1, the baseline separations between the $E_{x2}$ and $E_{z1}$ electrodes and between the $E_{y2}$ and $E_{z1}$ electrodes provide enhanced signal-to-noise performance, such that effective field measurements at lower levels can be achieved before hitting noise limits. For this example, when using techniques according to some embodiments (such as shown in FIG. 1), the signal-to-noise (S/N) ratio will be boosted by a factor of two due to the greater measurement baseline and sqrt(2) since two measurements are added together. This provides an S/N gain of 2*sqrt(2), which is the same as if the transmitter power was increased by a factor of 8. (Note that transmitter power scales as the square of the transmitter moment.) Another way to see the practical benefit of increasing the S/N ratio is that for the same S/N using the conventional configuration, it would require 8 times as long in time to be able to boost the S/N through stacking.

A further benefit offered by some embodiments is that, by adding multiple measurements, noise is reduced by the square root of the number of estimates.

Moreover, since the signal is coherent in all the measurements, the addition of measurements will reduce the incoherent noise by the square root of the number of measurements.

In different embodiments, instead of providing a single $E_{z1}$ electrode, two $E_{z1}$ and $E_{z2}$ electrodes can be provided in the z direction, while a single electrode is provided in either the x or y direction. In this case, the electric field in the x or y direction can be computed based on the measurement of the single electrode along the x or y direction and based on measurements of electrodes for measuring electric fields in at least one direction that is orthogonal to the x or y direction.

In an alternative embodiment, note also that one more of the $E_{x1}$, $E_2$, $E_{y1}$, and $E_{y2}$ electrodes can further be omitted while still being able to compute the corresponding electric fields using a technique similar to that discussed above.

Techniques according to some embodiment offers flexibility in how electrodes of the survey module 200 can be configured, such that an optimum configuration can be achieved based on considering reliability, cost of components, and ease of deployment.

In an alternative embodiment, similar techniques can be applied to non-stationary platforms. For example, in a marine survey arrangement, diagonal cables may be towed behind a marine vessel. Electrodes mounted on the diagonal cables provide upward and downward slanting dipoles, which can be algebraically combined to produce vertical and/or horizontal electric field components, similar to the techniques discussed above.

The concept of geometrically combining field measurements to enhance signal-to-noise performance can also be applied to magnetic field measurements. For high permeability cored induction sensors (magnetic field sensors), sensor performance improves with the square of the length of the core of the sensor. The effective length of the core can be increased by mounting the magnetic field sensors diagonally, such that a 12 increase in length can be achieved versus placing the magnetic field sensors horizontally. From diagonal measurements of magnetic fields, algebraic computations can be applied to derive the vertical and/or horizontal magnetic fields.

Figure 3:
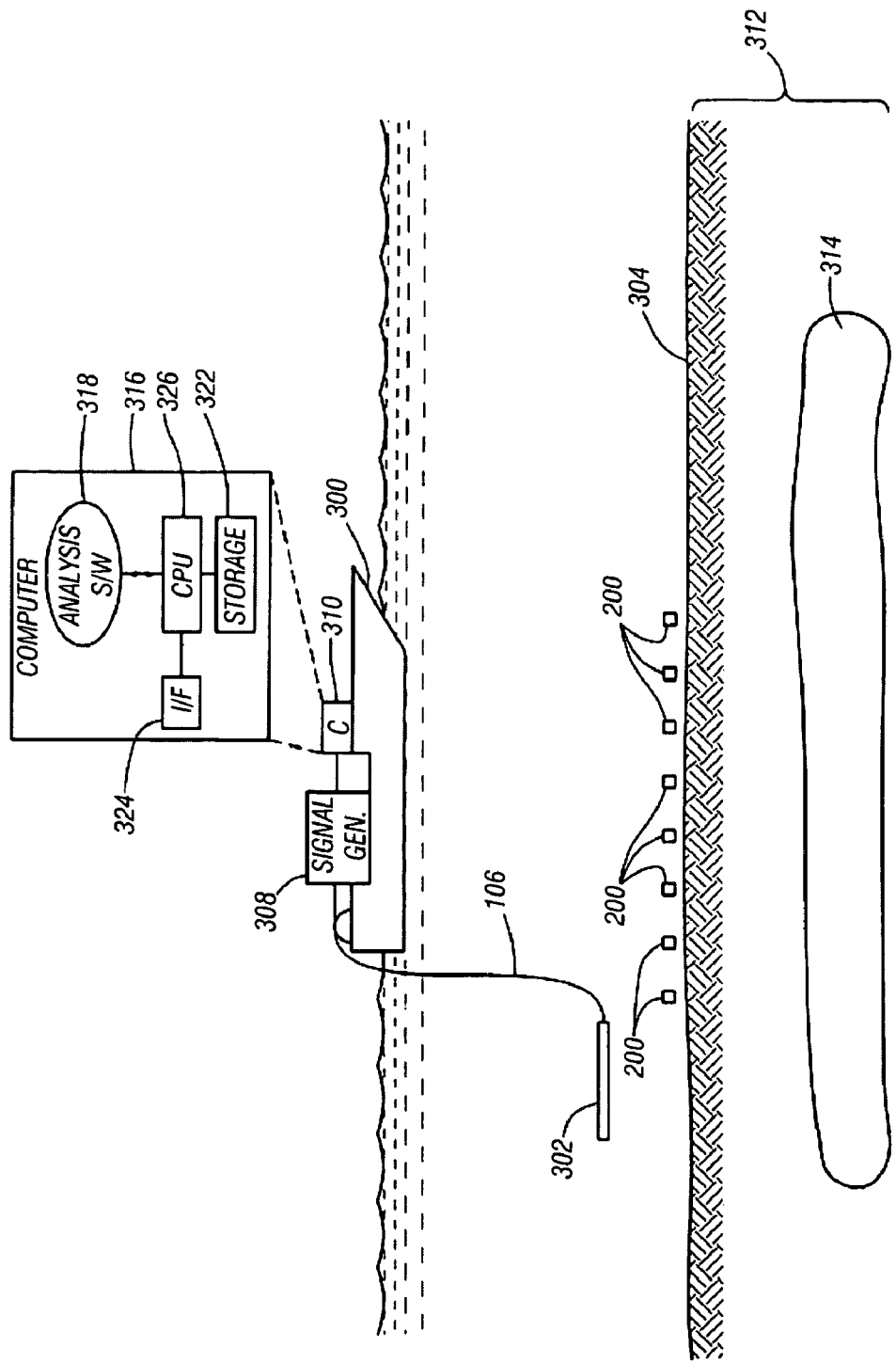
FIG. 3 is a schematic diagram of an exemplary marine survey arrangement for performing a survey of a subterranean structure underneath a water bottom surface, where the marine survey arrangement includes survey modules according to some embodiments.

FIG. 3 illustrates an example arrangement for performing controlled source electromagnetic (CSEM) marine surveying. As depicted in FIG. 3, a marine vessel 300 is capable of towing an EM transmitter 302 in sea water. The EM transmitter 302 is an electrical dipole in one example embodiment.

Although just one EM transmitter 302 is depicted, it is contemplated that alternative embodiments may use two or more EM transmitters 302.

The EM transmitter 302 is coupled by a cable 306 to a signal generator 308 on the sea vessel 300. Alternatively, the signal generator 308 can be contained within the EM transmitter 302. The signal generator 308 controls the frequency and magnitude of the electromagnetic signals generated by the transmitter 302.

In one embodiment, a plurality of survey modules 200 are arranged on the water bottom surface 304. In the example of FIG. 3, the plurality of survey modules 200 are arranged in a row. In other embodiments, the survey modules 200 can have other arrangements (such as an array of sensor modules or some random arrangement of sensor modules).

Measurements collected by electrodes (as described above) of each survey module 200 are used to characterize a subterranean structure 312 underneath the water bottom surface 304. In the example of FIG. 3, the subterranean structure 312 includes a subterranean element 314 of interest, which can be a hydrocarbon reservoir, a fresh water aquifer, a gas injection layer (such as to perform sequestration of carbon dioxide), and so forth. The presence of the subterranean element 314 of interest affects measurements made by the electrodes of the survey modules 200.

Each of the survey modules 200 includes a storage device for storing measurements made by the various sensing elements, including the electrodes and magnetic field sensors, in the survey module 200. The stored measurement data is retrieved at a later time when the survey modules 200 are retrieved to the marine vessel 300. The retrieved measurement data can be uploaded to a computer 316 on the marine vessel 300. The computer 316 has analysis software 318 capable of analyzing the measurement data for the purpose of creating a map of the subterranean structure 312.

The analysis software 318 in the computer 316 is executable on a central processing unit (CPU) 320 (or plural CPUs), which is coupled to a storage 322. An interface 324 that is coupled to the CPU 320 is provided to allow communication between the computer 316 and an external device. For example, the external device may be a removable storage device containing measurement data measured by the survey modules 200. Alternatively, the interface 324 can be coupled to a communications device for enabling communications of measurement data between the computer 316 and the survey modules 200, where the communications can be wired communications or wireless communications. The wired or wireless communications can be performed when the survey modules 200 have been retrieved to the marine vessel 300. Alternatively, the wired or wireless communications can be performed while the survey modules 200 remain on the water bottom surface 304.

Alternatively, instead of providing the computer 316 (and the analysis software 318) on the marine vessel 300, the computer 316 can instead be located at a remote location (e.g., at a land location). The measurement data from the survey modules 200 can be communicated by a wireless link (e.g., satellite link) from the marine vessel 300 to the remote location. In yet another alternative, each survey module 200 can include processing circuitry to process the measurement data and derive electric field values in accordance with some embodiments.

Figure 4:
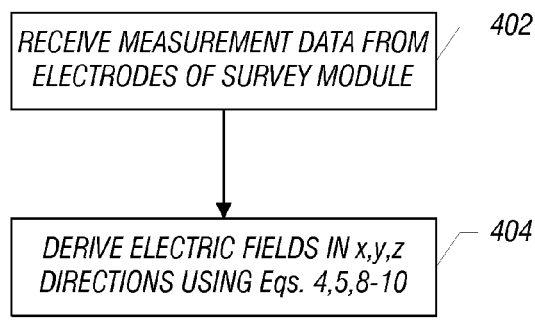
FIG. 4 is a flow diagram of calculating a vertical electric field using a technique according to an embodiment.

FIG. 4 shows an exemplary procedure according to an embodiment of deriving electric fields in various different directions. The procedure can be performed by circuitry depicted in FIG. 2. Alternatively, the procedure can be performed by the analysis software 318 (FIG. 3) in the computer 316 of FIG. 3. The circuitry receives (at 402) measurements from electrodes in a survey module 200 (FIG. 1). According to some embodiments, along at least one of multiple orthogonal directions x, y, and z, just a single electrode is provided, such as the single $E_{z1}$ electrode along the z direction shown in FIG. 1.

The circuitry derives (at 404) electric fields in each of the x, y, and z directions, where the computation of the $E_z$ electric field is based on the measurement of the single $E_{z1}$ electrode as well as measurement by at least one other electrode ($E_{x1}$, $E_{x2}$, $E_{y1}$, and $E_{y2}$ electrodes) that is used for measuring electric fields in orthogonal directions (x and y). In one embodiment, the electric fields in the x, y, and z directions are computed according to Eqs. 4, 5, and 8-10.

The derived electric fields, along with other data, are then used to characterize (at 406) the subterranean structure 312 (FIG. 3).

Instructions of software described above (including analysis software 318 of FIG. 3) are loaded for execution on a processor (such as one or more CPUs 426 in FIG. 3). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

The invention claimed is:

1. A method of performing electromagnetic surveying of a subterranean structure, comprising:
    receiving measurement data related to the electromagnetic surveying from first electrodes for measuring a first electric field in a first direction;
    receiving measurement data related to the electromagnetic surveying from a second electrode that is spaced apart from the first electrodes along a second direction that is different from the first direction; and
    deriving a second electric field in the second direction based at least in part on the measurements of the second electrode and at least one of the first electrodes.

2. The method of claim 1, wherein the first and second directions are orthogonal with respect to each other.

3. The method of claim 1, wherein deriving the second electric field in the second direction based on the measurements of the second electrode and at least one of the first electrodes improves a signal-to-noise ratio of the derived second electric field.

4. The method of claim 3, wherein the improved signal-to-noise ratio of the derived second electric field is due to a greater baseline.

5. The method of claim 1, wherein the first direction is generally parallel to a surface underneath which the subterranean structure is located.

6. The method of claim 5, wherein the first direction is a horizontal direction, and wherein the second direction is a vertical direction.

7. The method of claim 1, further comprising:
receiving measurement data related to the electromagnetic surveying from third electrodes for measuring a third electric field in a third direction that is different from both the first and second directions,
wherein deriving the second electric field in the second direction is further based on the measurement data of at least one of the third electrodes, wherein deriving the second electric field further based on the measurement data of at least one of the third electrodes further improves signal-to-noise performance.

8. The method of claim 7, further comprising:
calculating a first value based on the measurement data of the at least one first electrode and the second electrode;
calculating a second value based on the measurement data of the at least one third electrode and the second electrode; and
aggregating the first and second values to derive the second electric field.

9. The method of claim 8, wherein aggregating the first and second values comprises averaging the first and second values.

10. The method of claim 1, wherein receiving the measurement data at the first electrodes comprises receiving the measurement data of the first electrodes that are mounted to horizontal arms of a sensor module, and wherein receiving the measurement data of the second electrode comprises receiving the measurement data of the second electrode mounted on a vertical arm of the sensor module.

11. A survey module, comprising:
at least a first sensing element and a second sensing element to measure a first electric field along a first direction;
a third sensing element spaced apart along a second, different direction from the first and second sensing elements; and
circuitry to derive a second electric field along the second direction based at least in part on the first electric field.

12. The survey module of claim 11, further comprising flexible arms on which the first, second, and third sensing elements are respectively mounted.

13. A survey module, comprising:
a first pair of electrodes to measure a first electric field along a first direction;
a second electrode spaced apart from the first pair of electrodes along a second, different direction; and
circuitry to derive a second electric field along the second direction based at least in part on measurement of the second electrode and measurement of at least one of the first pair of electrodes.

14. The survey module of claim 13, further comprising:
a second pair of electrodes to measure a second electric field along a third direction different from the first and second directions,
wherein the second electric field is derived further based on measurement of at least one of the second pair of electrodes.

15. The survey module of claim 14, wherein the first and third directions are orthogonal horizontal directions, and wherein the second direction is a vertical direction.

16. The survey module of claim 13, wherein the first direction is a horizontal direction, and wherein the second direction is a vertical direction.

* * * * *